(12) United States Patent
Sure et al.

(10) Patent No.: US 11,260,988 B2
(45) Date of Patent: Mar. 1, 2022

(54) AIRCRAFT LIGHTING SYSTEM TO ENABLE SHARING OF OPTICAL ENERGY BETWEEN LIGHT ASSEMBLIES WITH PASSIVE LIGHT HEADS

(71) Applicant: HONEYWELL INTERNATIONAL INC., Morris Plains, NJ (US)

(72) Inventors: Anita Sure, Karnataka (IN); Sunit Kumar Saxena, Karnataka (IN); Mark Poling, Springfield, OH (US); Gowtham Kumar Vankayala, Karnataka (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 296 days.

(21) Appl. No.: 16/291,295

(22) Filed: Mar. 4, 2019

(65) Prior Publication Data

US 2020/0283166 A1  Sep. 10, 2020

(51) Int. Cl.
| | |
|---|---|
| *B64D 47/06* | (2006.01) |
| *F21S 41/141* | (2018.01) |
| *B60Q 1/00* | (2006.01) |
| *H05B 45/00* | (2022.01) |

(52) U.S. Cl.
CPC .......... *B64D 47/06* (2013.01); *B60Q 1/0011* (2013.01); *F21S 41/141* (2018.01); *H05B 45/00* (2020.01); *B64D 2203/00* (2013.01)

(58) Field of Classification Search
CPC .... B64D 47/06; B64D 2203/00; B64D 47/02; B64D 47/04; B64D 47/00; H05B 45/00; F21S 41/141; B60Q 1/0011; B64F 1/20
See application file for complete search history.

(56) References Cited

U.S. PATENT DOCUMENTS

| | | | | |
|---|---|---|---|---|
| 3,434,601 A | * | 3/1969 | Karl ................. | B01D 35/005 210/440 |
| 4,811,172 A | * | 3/1989 | Davenport ......... | B60Q 1/0011 362/511 |
| 5,293,304 A | * | 3/1994 | Godfrey ............ | B64D 47/06 315/315 |
| 5,311,410 A | * | 5/1994 | Hsu ................... | F21S 41/635 362/552 |
| 5,690,408 A | * | 11/1997 | de la Pena ........ | B60Q 1/0011 362/470 |
| 6,006,158 A | * | 12/1999 | Pilley ................ | G08G 5/0043 701/120 |

(Continued)

*Primary Examiner* — Fatima N Farokhrooz
(74) *Attorney, Agent, or Firm* — Lorenz & Kopf, LLP

(57) ABSTRACT

An aircraft lighting system (ALS) and apparatus which includes: a lighting generator control unit (LGCU) controlling a light source generator for generating a first, second and third type of light to each passive light head; a light bus coupled to the light source generator to receive the first, second, and third types of light and for converting the first type of light to a fourth type of light; a plurality of light transmission elements coupled to the light source generator; a plurality of light switches responsive to a switch command from the LGCU to optically not direct or direct light from the light bus to a light transmission element; a light conversion element connected for converting the first type to the fourth type of light; and the LGCU configured to command the light source generator to generate light in accordance with a load profile.

20 Claims, 10 Drawing Sheets

(56) References Cited

U.S. PATENT DOCUMENTS

| | | | | |
|---|---|---|---|---|
| 6,439,751 B1* | 8/2002 | Jones | ............... | B60Q 1/00 |
| | | | | 362/470 |
| 8,023,784 B1* | 9/2011 | Beranek | ............... | G02B 6/4292 |
| | | | | 385/33 |
| 9,469,415 B1* | 10/2016 | Harvey | ............... | B64D 47/04 |
| 10,543,933 B1* | 1/2020 | Tillotson | ............... | B64D 47/08 |
| 2003/0063884 A1* | 4/2003 | Smith | ............... | G02B 6/032 |
| | | | | 385/129 |
| 2003/0185490 A1* | 10/2003 | Lopes | ............... | G02F 1/3132 |
| | | | | 385/16 |
| 2004/0090787 A1* | 5/2004 | Dowling | ............... | H05B 45/00 |
| | | | | 362/464 |
| 2005/0190078 A1* | 9/2005 | Salter | ............... | H05B 47/22 |
| | | | | 340/945 |
| 2008/0137353 A1 | 6/2008 | Larsen et al. | | |
| 2011/0305031 A1* | 12/2011 | Riedel | ............... | B60Q 3/43 |
| | | | | 362/471 |
| 2012/0195056 A1* | 8/2012 | Edmond | ............... | B64C 23/069 |
| | | | | 362/470 |
| 2014/0301095 A1* | 10/2014 | Lengers | ............... | B29D 11/00673 |
| | | | | 362/470 |
| 2015/0146443 A1* | 5/2015 | Gagnon | ............... | B64D 47/04 |
| | | | | 362/470 |
| 2016/0200421 A1* | 7/2016 | Morrison | ............... | B64C 13/18 |
| | | | | 244/17.23 |
| 2017/0203855 A1* | 7/2017 | Leclear | ............... | B64D 47/06 |
| 2019/0097722 A1* | 3/2019 | McLaurin | ............... | G02B 19/0057 |
| 2019/0300201 A1* | 10/2019 | Edwards | ............... | B64C 3/56 |

\* cited by examiner

AIRCRAFT LIGHTING SYSTEM TO ENABLE SHARING OF OPTICAL ENERGY BETWEEN LIGHT ASSEMBLIES WITH PASSIVE LIGHT HEADS

TECHNICAL FIELD

Embodiments of the subject matter described herein relate generally to a distributed architecture of an aircraft lighting system (ALS) and in particular, embodiments of the subject matter relate to systems and apparatuses of distributed configurations of components which make up the control and component infrastructure of an ALS for enabling shared controllers and a positioning of ALS components at aircraft locations remote from the aircraft light for less harsh exterior environment exposure and for enhancing performance and longevity of the overall ALS.

BACKGROUND

The exterior locations on aircraft are often exposed to severe environments which can result in subjecting components of an aircraft light to harsh conditions resulting in its decreased lifespan. For example, it is not uncommon to have harsh environment conditions with thermal temperature ranges from −55° C. to 85° C. and with rapid temperature rate changes as high as 10° C./min as well as high vibration levels typically in the range of 13.9 g. which have deteriorating affects to the light components. Moreover, the vibration amounts experienced can be significant; for example, at the wingtips, vibrations can easily exceed 100 G units (m/s$^2$). Also, other harsh conditions can occur, including weather conditions of: electromagnetic interferences, humidity, water, moisture, fluids, salt spray, icing/freezing rain, acidic environment; sand and dust; direct lightning; P-static; explosive atmosphere; solar radiation and all the weather conditions exert a toll on the light components. This results in affecting factors such as: their overall robustness, the need to inspect them more often and their failure rates. In addition, in the construction of light components housings to compensate for this kind of environment more material hardening and ruggedization is needed which leads to a higher product cost and in many instances the added costs may not commensurate with the desired needs to combat or counterbalance the harsh environment.

Moreover, due to such physical environmental and operational limitations, aircraft lights cannot be currently positioned at all locations that are deemed to have significant impacts on visibility and safety of the aircraft operation. That is, additional desired light locations desired can include: the engine etc. that are not currently feasible as some lighting components have operating condition limitations that are not always within these high demand environment stimuli (i.e. engine vibrations etc.) locations.

Therefore, it is desirable and advantageous to have and use a distributed configuration of aircraft light control and infrastructure components of an aircraft lighting system (ALS) that positions controllers and components that make up the ALS, close too and remotely from the aircraft light or passive light head to lessen exposure to the harsh exterior conditions of an operating aircraft, to use common controller elements, and to enable optical switching elements responsive to the common controller elements for directing light between conversion elements and passive light heads to enhance the overall performance and longevity of the ALS.

Other desirable features and characteristics of the herein described embodiments will become apparent from the subsequent detailed description and the appended claims, taken in conjunction with the accompanying drawings and the foregoing technical field and background.

SUMMARY

Some embodiments of the present disclosure provide a system and an apparatus for distributed configurations of the controllers and passive components which make up the assembly of an ALS where some of the components are positioned and distributed at aircraft locations remote from the aircraft light locations for optimal use and for less exposure to the exterior environment.

In an exemplary embodiment, an aircraft lighting system with a distributed lighting component architecture is provided. The aircraft lighting system includes: at least one light source generator actuated by an electric drive source and serving as a common light source for generating light to a plurality of passive light heads; at least one lighting generator control unit (LGCU) for controlling the at least one light source generator; and a light switch network coupled to the at least one light source generator receiving at least one of a plurality of types of light generated, and further selectively coupled to a light conversion element for generating a different type of light at the passive light head, the light switch network further includes: a plurality of light switches, each light switch coupled between the light source generator and an associated one of the plurality of light transmission elements, each light switch responsive to a switch command from the LGCU to move between an open position, in which the switch optically does not direct the light of the light source generator from an associated light transmission element, and a closed position, in which the switch optically directs light from the light source generator to the associated light transmission element; wherein the LGCU is coupled to the light source generator and each of the light switches, the LGCU configured to: (i) command the light source generator for generating light in accordance with a light load demand profile and (ii) command each of the light switches to move to the open position or to the closed position, whereby the light generated by the light source generators is selectively supplied to at least one of the passive light heads.

The aircraft lighting system further includes: the light source generator configured to generate a set of lights including: a first light type of blue light, a second light type of green light, a third light type of red light, a fourth light type of white light wherein the white light is generated by converting the blue light or any other available suitable colored light generated which can be effectively converted into white light wherein the green, red and white lights comprise: an aviation green, an aviation red light, and an aviation white light respectively. The aircraft lighting system, further includes: a left hand side lighting system; a right hand side lighting system; an interconnected light switch configured for connecting the left hand side lighting system and the right hand side together wherein the interconnected light switch is responsive to switch commands from the LGCU to direct light from either side to an opposite side wherein the light is generated from at least one light source generator for sending at least one of the first, second, and third light types to the passive light heads on located on the opposite side.

The aircraft lighting system, further includes: at least one light conversion element connected between an associated light transmission element and the passive light head. The aircraft lighting system further includes: the light source generator configured at a location which is remote from the passive light head wherein the location of the light source generator is less exposed to an exterior environment of an aircraft.

The aircraft lighting system further includes: the light load demand profile received by the LGCU during a particular flight phase to control the light presented by the passive light head based on an aircraft flight phase. The light load demand profile is associated with a set of aircraft flight phases which comprise: a flight planning, a push-back, a taxiing, a takeoff, a cruising, a descending, a final approach and a landing wherein the flight planning comprises: a cargo loading. The aircraft lighting system, further includes: a fiber cable used as the light transmission element coupled to the light switch network, enabling light transmission by directing light on a selected channel of the fiber cable to at least one of the passive light heads. The fiber cable enables light transmission without requiring an electrical chassis ground bonding of an assembly comprising: the passive light head to an aircraft structure. The aircraft lighting system, further includes: a health monitoring system configured to provide notification for a level of degradation of performance of a set of components comprising at least one or more of: the passive light head, the light source generator, the light transmission element, and the light switch. The aircraft lighting system, further includes: the LGCU coupled to the health monitoring system to enable monitoring of the performance of the set of components and for optimizing performance of the light source generators by commanding the light switches to ensure minimum amount of lights required produced during each flight phase by a set of passive light heads.

In another embodiment, an aircraft lighting apparatus is provided. The aircraft lighting apparatus includes: at least one lighting generator control unit (LGCU) controlling at least one light source generator for generating light to a set of a plurality of passive light heads; the at least one light source generator generating a blue, a red, or a green light; each light comprising: a respective blue, aviation red or aviation green light; a light switch network coupled to the at least one light source generator to receive the blue, the aviation red or the aviation green light and for converting the blue light at the passive light head to a white light wherein the white light comprises: an aviation white light; a plurality of light transmission elements coupled to the at least one light source generator; the light switch network comprising: a plurality of light switches, each light switch coupled between the light source generator and an associated one of the plurality of light transmission elements, each light switch responsive to the LGCU to optically not direct the light of the light source generator from an associated light transmission element, and to optically direct light from the light source generator to the associated light transmission element; and a light conversion elements connected between the associated light transmission element and the passive light head when converting the blue light to the aviation white light at the passive light heads for presenting by the passive light heads; wherein the LGCU is coupled to the light source generator and coupled to each of the light switches, the LGCU is configured to (i) command the light source generator to generate light in accordance with a light load demand profile and to (ii) selectively command each of the light switches to move to an open or a closed position, whereby the light generated by each of the light source generators is selectively supplied to one or more of the passive light heads.

In various exemplary embodiments, the aircraft lighting system with the light switch network which further includes: a set of optical switches for: (i) directing light which is transmitted to transmission elements associated with each passive light head, for (ii) not directing light from being transmitted to transmission elements associated with each passive light head and for (iii) diverting light between a set of different transmission elements. The aircraft lighting system, further includes: the light source generator configured at a location which is remote from the passive light head wherein the location of the light source generator is less exposed to an exterior environment of an aircraft.

The aircraft lighting system, further includes: a light load demand profile received by the LGCU during a particular flight phase to control the light at the passive light head based on an aircraft flight phase. The light load demand profile is associated with a set of aircraft flight phases which comprise: a flight planning, a push-back, a taxiing, a takeoff, a cruising, a descending, a final approach and a landing flight phase wherein the flight planning comprises: a cargo loading. The aircraft lighting system, further includes: a fiber cable used as the light transmission element coupled to the optical light switch for light transmission by directing light on a selected channel of the fiber cable to the passive light head. The fiber cable enables light transmission without requiring an electrical chassis ground bonding of the passive light head to the fiber cable. The aircraft lighting system, further includes: a health monitoring system configured to: monitor at least the passive light head and the transmission element to provide a notification for a level of degradation of performance of the passive light head or the transmission element.

In yet another embodiment, a replacement aircraft lighting system, is provided. The replacement aircraft lighting system includes: at least one lighting generator control unit (LGCU) controlling at least one light source generator for generating light to a set of a plurality of passive light heads; the at least one light source generator generating a blue, an aviation red, or an aviation green light to each passive light head of the set of the plurality of passive light heads; a light switch network coupled to the at least one light source generator to receive the blue, the aviation red or the aviation green light and to convert the blue light at the passive light head to an aviation white light; a plurality of light transmission elements coupled to the at least one light source generator; a light switch network comprising: a plurality of light switches, each light switch coupled between the light generator and an associated one of the plurality of light transmission elements, each light switch responsive to the LGCU to optically not direct the light of the light generator from an associated light transmission element, and to optically direct light from the light generator to the associated light transmission element; a light conversion elements connected between the associated light transmission element and the passive light head to convert the blue light to the aviation white light at the passive light heads for presentation as required; the LGCU coupled to the light source generator and each of the light switches, the LGCU configured to (i) command the light source generator to generate light in accordance with a light load demand profile and to (ii) selectively command each of the light switches to move to an open or a closed position, whereby the light generated by each of the light source generators is selectively supplied to one or more of the passive light heads; a fiber cable used as the light transmission element coupled to the optical light switch for light transmission by directing light on a selected channel of the fiber cable to the passive light head; and a passive light head which is at least one of an attribute of lighter and more compact than a legacy light head replaced at a light location of an aircraft;

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
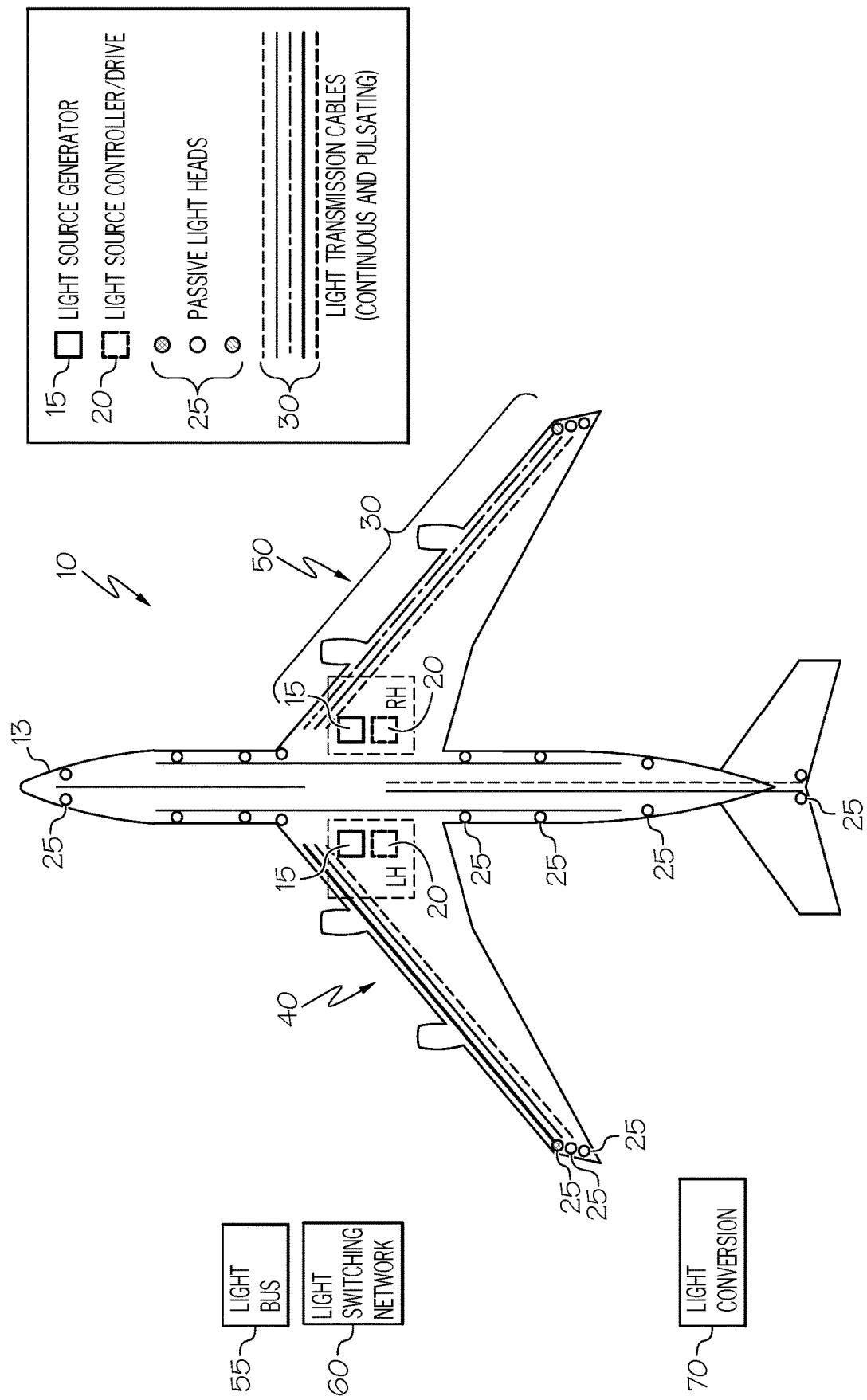
FIG. 1 illustrates a diagram of a graphic depiction of components of lights in an aircraft in accordance with herein described embodiments.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Embodiments of the subject matter described herein provide distributing and locating various control and infrastructure components of the ALS close too and remotely from the aircraft light to lessen exposure of the some of the lighting components to the harsh environment of an operating aircraft and to achieve by a shared control architecture a more robust overall aircraft lighting system in use.

The light of an aircraft has three major components: the light head which contains the necessary optics (such as Lens, Reflectors etc.), the light source and generator which includes various light emitting components; such as LEDs, filament bulbs etc., and the light controller/drive power supply which provides the necessary drive and excitation to the light source and generators. Each light on an aircraft has its own light source, power supply controller, light-head, enclosures, electromagnetic interference (EMI) filters, chassis bonding, circuit breakers, electrical wiring etc. In other words, each light is constructed with an architecture were the light source and the associated electronic controllers are packaged and housed directly inside the light and the light itself is installed at several locations on the aircraft exterior. The light can reside at the exterior locations of the wingtips, winglets, landing gear, tail-cone, wing-roots etc. to provide optimal exterior luminescence and visibility.

Further, for the aircraft with composite structures, thermal management of high power lights (i.e. light emitting diode (LED) light-heads) and associated control circuitry which are installed at the light location is necessary. For example, the composite structure of the aircraft with the high powered light head requires thermal dissipation to prevent damage to light source and control circuitry of the light. In addition, in the configuration, factors such as the cost, complexity, and a compromise of the light performance must also be considered for those lights to avoid hot spots. For example, for a cargo door light; the cargo door light has to be mounted on a thermal insulating foam to inhibit the transfer of heat to the aircraft structure which in turn can increase the overall cost and constraint the light design.

Further, systems and apparatuses are presented of an ALS that control switching operations of an electric light source controller/drive controlling a light source sent on a light bus to a light switch which transmits blue, aviation red and aviation green, where blue light which can be converted remotely at the light head by a light conversion component.

FIG. 1 illustrates a diagram of one embodiment of a distributed aircraft lighting system 10. In FIG. 1, the system 10 is disposed in an aircraft 13 and includes at least one or more light source generators 15, one or more electric light source controller/drives 20, a plurality of light transmission cables 30, and a plurality of passive light heads 25. Although not depicted in FIG. 1, but as will be described further below, the system 10 may additionally include a light bus, a plurality of light switches, and a plurality of light conversion elements 70. In the depicted exemplary embodiment, the system 10 is configured with a left hand subsystem 40 and a right hand subsystem 50. The light conversion element 70 converts the light generated by the light source (i.e. light source generators 15) to light of any desired wavelength to be presented at the passive light head 25. For instance a blue light generated by the light source can be converted into aviation white at the passive light head by phosphor conversion elements.

In various embodiments, the light source generators 15 may be configured to generate one or more of blue light, red light and/or green light. As will be described further below, when the light source generators are configured to generate blue light, the system 10 may additionally include conversion elements, such as phosphor conversion elements, which convert blue light to white light. In various embodiments, the light switches of the light switch network 60 may be implemented using, for example, a MEMS (Micro electro mechanical System) based fiber optic switching device. The light switch of the light switch network 60 is an electronically controlled device that is configured such that the output can be switched to one of a plurality of channels for transmitting.

The light source generators 15 are disposed at remote locations from the passive light heads 25. The light source generators 15 are optimized based on a light load demand profile to control modes of operation of the number of passive light heads 25 during, for example, each of the various aircraft flight phases. In an exemplary embodiment, the light source generators 15 (or other lighting components) can be remotely located in a temperature controlled interior aircraft environment remote from the passive light heads 25 to provide conditions of reduced vibrations and humidity. The interior location can also provide more space for thermal expansion enabling enhanced thermal management.

The light switch network 60 composed of the light switches and light bus 55 can be configured, distributed and located at a remote location from the passive light head 25 and therefore can be configured for less exterior exposure than is present at the passive light head location.

In various exemplary embodiments, the lighting components at each light location therefore have a more compact passive light head than that of a replaced legacy lighting system. In an exemplary example, a retro-fitment of a replaced legacy lightening system may include: a placement of a passive light head and the light source generator of an integrated power supply (i.e. light source generator 15 and light source controller and drive 20) at a remote location to create space for other aircraft sensors to use at a replacement location in aircraft operation. The light bus 55 generates light that can be transferred between the distributed lighting components of the left hand lighting system 40 and right hand lighting system 50 which enables lighting operations with enhanced reliability and more lighting systems available in the aircraft 13. The light transmission cables 30 can be embedded in the aircraft 13 body structure (for ex: composite body structure). The light transmission 65 via optical fiber cables which use MEMS switches for directing light and therefore do not require an electric source for dielectric breakdown in switching operations (i.e. as required by digital switches) and a light-head bonding requirement for operation.

Figure 2:
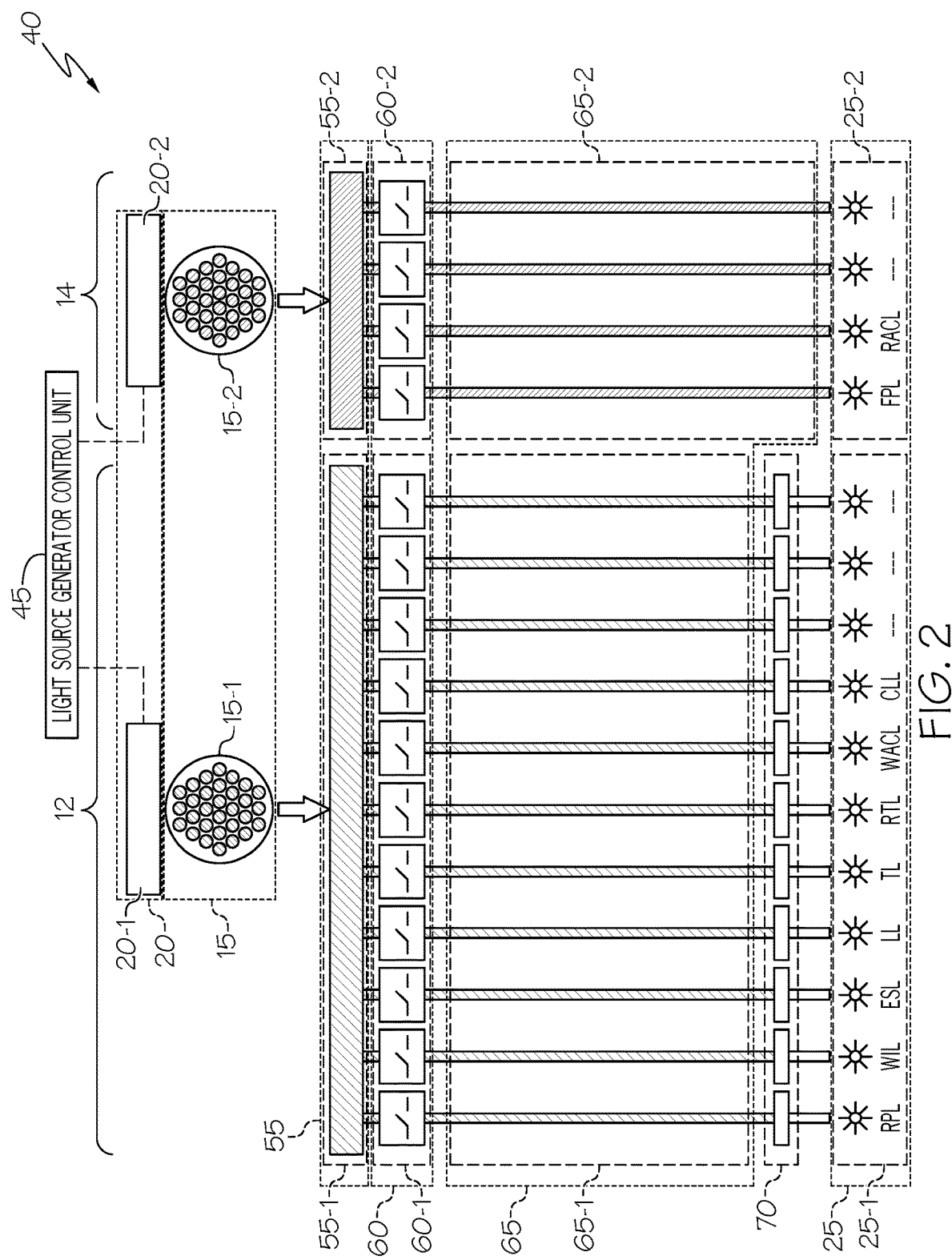
FIG. 2 illustrates a diagram of a left hand (LH) lighting system of a LH and a Right Hand (RH) lighting system in an aircraft in accordance with herein described embodiments.

FIG. 2 illustrates a more detailed schematic diagram of the left hand (LH) subsystem 40 of FIG. 1 in accordance with herein described embodiments. The LH subsystem 40 includes a first part 12 and a second part 14. The LH subsystem 40 includes a light source controller/drive 20, a light source generator 15, a light bus 55, a plurality of light switches 60, a plurality of light transmission cables 65, a plurality of light conversion elements 70 and a plurality of passive light heads 25. The LH subsystem 40 in the first part includes a light source controller/drive 20-1, a light source generator 15-1, a light bus 55-1, a plurality of light switches 60-1, a plurality of light transmission cables 65-1, a plurality of light conversion elements 70 and a plurality of passive light heads 25-1.

The LH subsystem 40 in the second part 14 includes a light source controller/drive 20-2, a light source generator 15-2, a light bus 55-2, a plurality of light switches 60-2, a plurality of light transmission cables 65-2, and a plurality of passive light heads 25-2. As FIG. 2 clearly depicts, the second part 14 of the LH subsystem 40 does not include light conversion elements 70.

As noted previously, the electric light source controller/drives 20 can be located at a location remote from the passive light heads 25. The light source generators 15 are optimized/tuned based on load demand profiles and, as will be described further below, can operate in a phased manner based on the aircraft flight phase. The light switches 60 can also be located remotely from the passive light heads 25. The electric light source controllers/drives 20 and the light source generators 15 can operate in two modes: a) a fixed lumen mode and b) a controlled lumen mode. In the fixed lumen mode, either of the light source generators will generate light lumens at a predetermined level, which can be configured to remain fixed irrespective of the aircraft flight mode. In the controlled lumen mode, either of the light source generators will generate light lumens at an adjusted levels, which can be configured to the aircraft flight mode.

The LH subsystem 40 may also include a Light Generator Control Unit (LGCU) 45. The LGCU 45, when included, is configured to operate in the following modes: a) in a first mode, the LGCU 45 interfaces with avionics which generate requests based on an expected light load (i.e. actuation of passive light heads) during a particular aircraft flight phase and which enable control applications of a variable operability of the light lumen demand based on the expected demand for each of the light source generators 15-1, 15-2; b) in a second mode, the LGCU 45 is programmed by control applications to receive data from a necessary or required number of sensors (not shown) to measure amounts of flux generated from the light and for determining a set of intensity measurements (i.e. similar to voltage and current monitoring) of actual values sensed for comparisons with predetermined levels of the required flux and intensity levels; c) in a third mode, the LGCU 45 will vary the light lumen demand for the light source generator by a varying process that can be controlled in a (a) proactive, (b) predictive, and (c) reactive manner to sensed changes of flux and intensity levels. Hence, the LGCU 45 may have a number of types of control modes for optimization operations for adjusting demands of the light source generator for changes in the passive light heads.

In addition, the LGCU 45 may be configured to detect faults in various components of the aircraft lighting system such as the following components: light source controller/Drive 20, light source generator 15, light Bus 55, light switches 60, light transmission lines 65, light conversion and passive light heads 25. In an exemplary embodiment, a fault can be detected by the LGCU 45 if the difference between an input light flux and output light flux exceeds a pre-defined level. The LGCU 45 may include applications for health monitoring, that is monitoring the various components of the aircraft lighting system to provide notifications and pre-defined actions for certain levels of degradation of the components, and stages of component operation such as near the end of the component's operating life, or the actual end of life requiring the components be replaced.

Figure 3:
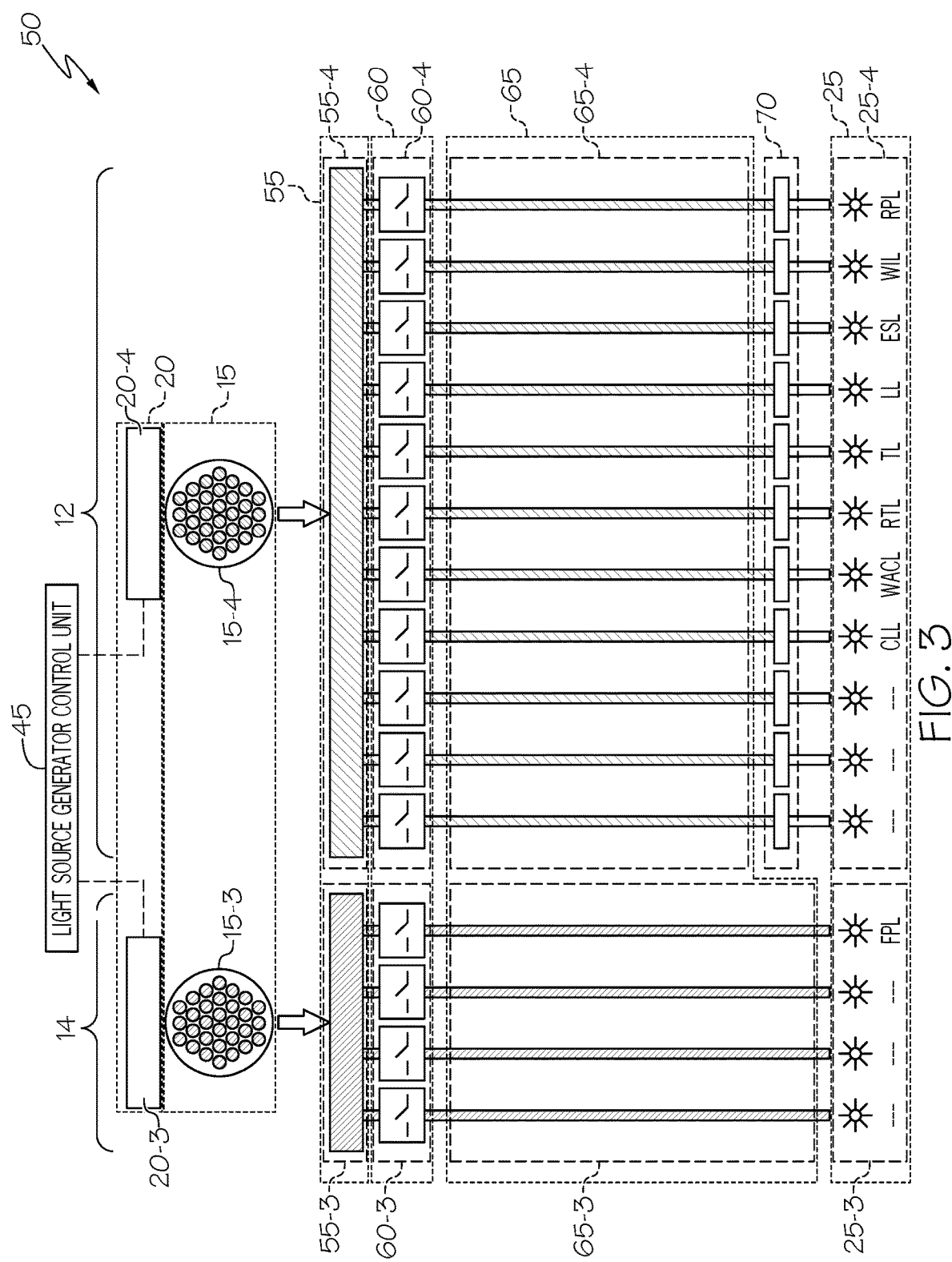
FIG. 3 illustrates a diagram of the RH lighting system of the LH and RH lighting system in an aircraft in accordance with herein described embodiments.

FIG. 3 illustrates a diagram of the RH lighting system of the LH and RH lighting system in an aircraft in accordance with herein described embodiments. The RH lighting system diagram of FIG. 3 is similar to the LH lighting system diagram of FIG. 2 but directs a different light color of green if red is directed on the opposing side is required by aviation regulations. Briefly, (with similarity to FIG. 2) the RH lighting system 50 includes a first part 12 and a second part 14.

The RH subsystem 50 includes a light source controller/drive 20, a light source generator 15, a light bus 55, a plurality of light switches 60, a plurality of light transmission cables 65, a plurality of light conversion elements 70 and a plurality of passive light heads 25. The RH subsystem 50 in the first part includes a light source controller/drive 20-4, a light source generator 15-4, a light bus 55-4, a plurality of light switches 60-4, a plurality of light transmission cables 65-4, a plurality of light conversion elements 70 and a plurality of passive light heads 25-4.

The RH subsystem 50 in the second part 14 includes a light source controller/drive 20-3, a light source generator 15-3, a light bus 55-3, a plurality of light switches 60-3, a plurality of light transmission cables 65-3, and a plurality of passive light heads 25-3. As FIG. 3 clearly depicts, the second part 14 of the RH subsystem 50 does not include light conversion elements 70.

As noted previously, the electric light source controller/drives 20 can be located at a location remote from the passive light heads 25. The light source generators 15 are optimized/tuned based on load demand profiles and, as will be described further below, can operate in a phased manner based on the aircraft flight phase. The light switches 60 can also be located remotely from the passive light heads 25. The electric light source controllers/drives 20 and the light source generators 15 can operate in two modes: a) a fixed lumen mode and b) a controlled lumen mode. In the fixed lumen mode, either of the light source generators will generate light lumens at a predetermined level, which can be configured to remain fixed irrespective of the aircraft flight mode. In the controlled lumen mode, either of the light source generators will generate light lumens at adjusted levels, which can be configured to the aircraft flight mode.

The RH subsystem 50 (i.e. like the LH subsystem 40) may also include a Light Generator Control Unit (LGCU) 45. A light Generator Control Unit (LGCU) 45 is or can be incorporated in aircraft LH lighting sub-system 40. The LGCU 45 may or will operate in similar modes as in the RH lighting subsystem 50. The modes of either of the LGCUs may operate in tangent or may operate separately. In addition, while the LGCU is depicted as a separate module for the RH and LH lighting systems, the LGCU may be configured or implemented as a single module coupled to both the RH and LH lighting systems. Further, the LGCU may also integrate the various light source controllers and drives of both lighting systems. In other words, the light source controllers and drives could be implemented remotely from the passive light heads at a single or multiple LGCUs.

The LGCU 45, when included, is configured to operate in the following modes: a) in a first mode, the LGCU 45 interfaces with avionics which generate requests based on an expected light load (i.e. actuation of passive light heads) during a particular aircraft flight phase and which enable control applications of a variable operability of the light lumen demand based on the expected demand for each of the light source generators 15-1, 15-2, 15-3, 15-4; b) in a second mode, the LGCU 45 is programmed by control applications to receive data from a necessary or required number of sensors (not shown) to measure amounts of flux generated from the light and for determining a set of intensity measurements (i.e. similar to voltage and current monitoring) of actual values sensed for comparisons with predetermined levels of the required flux and intensity levels; c) in a third mode, the LGCU 45 will vary the light lumen demand for the light source generator by a varying process that can be controlled in a (a) proactive, (b) predictive, and (c) reactive manner to sensed changes of flux and intensity levels. Hence, the LGCU 45 may have a number of types of control modes for optimization operations for adjusting demands of the light source generator for changes in the passive light heads.

In addition, the LGCU 45 may be configured to detect faults in various components of the aircraft lighting system such as the following components: light source controller/Drive 20, light source generator 15, light Bus 55, light switches 60, light transmission lines 65, light conversion and passive light heads 25. In an exemplary embodiment, a fault can be detected by the LGCU 45 if the difference between an input light flux and output light flux exceeds a pre-defined level. The LGCU 45 may include applications for health monitoring, that is monitoring the various components of the aircraft lighting system to provide notifications and pre-defined actions for certain levels of degradation of the components, and stages of component operation such as near the end of the component's operating life, or the actual end of life requiring the components be replaced.

The characteristics of the LH and RH subsystems 40, 50 can be determined by summing of each of the component parts. That is, the total power supply capacity of the LH/RH light source controllers and drives 20 is the sum of the output of the LH and RH light source generators 15 minus the total of the supplied electric drive source used for each of the lights (i.e. $PS\_light_1 + PS\_light_2 + PS\_light_3 + \ldots + PS\_light_n$) where PS is the electric drive source for each light. The total installed capacity of the LH/RH light source generators 15 can be characterized as the sum of the each of the light source generators capacity (i.e. LH_LS+RH_LS) minus the total of the supplied electric light source used by each of the lights (i.e. $LS\_light_1 + LS\_light_2 + LS\_light_3 + \ldots + LS\_light_n$) where LS is the light source generator for each light. The total number of enclosures (for harsh environmental conditions) required to enable the system is the sum of all of the passive light heads (i.e. $light_1 + light_2 + light_3 + \ldots + light_n$). The total number of enclosures (for harsh environment) required is therefore equal to the number of passive light heads 25 used on the aircraft (i.e. $light_1 + light_2 + light_3 + \ldots + light_n$). The total number of chassis ground bonding required for the lights is zero because all the light heads which are used in the configuration of the aircraft lighting system are passive lighting elements. The total number of chassis ground bonding required for the remote power supplies equals the sum of the LH and RH power supplies (i.e. LH_PS+RH_PS). The total number of circuit breakers (CB) which required for the lighting configuration is the sum of the LH and RH side circuit breakers (i.e. LH_CB+RH_CB). The total number of failure rates that can be detected for the lighting configuration is the sum of the failure rate for each of lights (i.e. $FR\_PS\_LH + FR\_PS\_RH + FR\_PassivelightHead_1 + FR\_PassivelightHead_2 + FR\_PassivelightHead_3 + \ldots + FR\_PassivelightHead_n + FR\_lightSource\_RH + FR\_lightSource\_LH$) where FR is the failure rate for each passive light head.

The share/transfer/use of the installed lighting components among the different passive light heads includes a plethora of potential combinations that can at least equal the number of light switch network transfers that conceivably could be made or are possible for at least a white colored light used at aircraft locations. In various embodiments, the RH/LH light system 50, 40 enables an optimal utilization of the total lighting system infrastructure on an aircraft by architecture level changes; where components of the lighting infrastructure are optimally utilized, can be shared as needed or on a systematic/scheduled basis among different sets of passive light heads and the components can also be remotely located at less harsh environment locations on the aircraft.

Figure 4A:
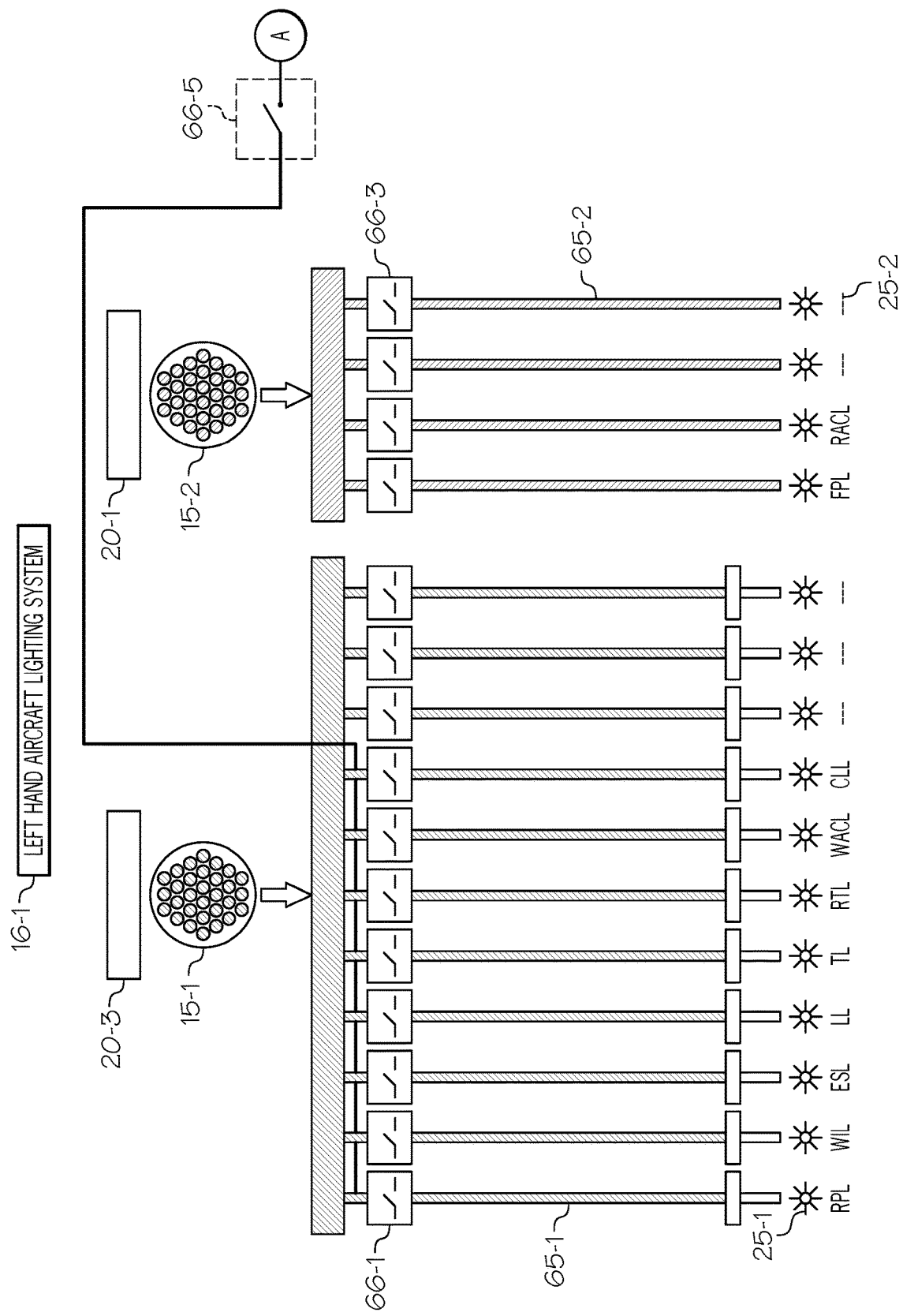
FIGS. 4A and 4B illustrate diagrams of both the LH and the RH aircraft lighting systems of FIGS. 2 and 3 connected together in an integrated LH/RH aircraft lighting system in accordance with herein described embodiments.
Figure 4B:
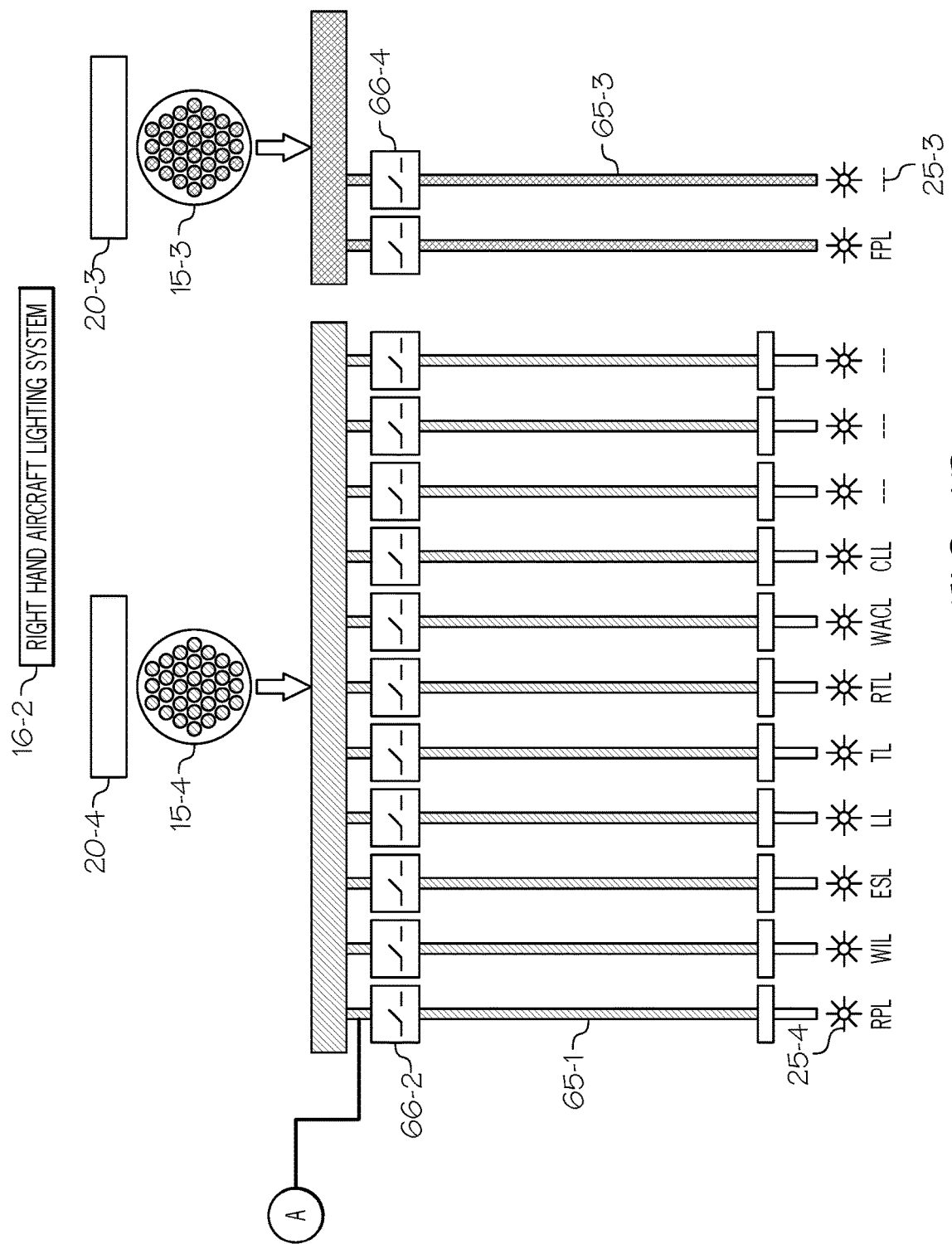

FIGS. 4A and 4B illustrate diagrams of both the LH and the RH aircraft lighting systems of FIGS. 2 and 3 connected together in an integrated LH/RH aircraft lighting system in accordance with herein described embodiments. FIG. 4A shows a LH aircraft lighting system 16-1 with light source controller/drive 20-3 and 20-1 with light source generators 15-1,15-2 connected to optical light switches 66-1 and 66-3 with respective light buses that form the optical light switch network on the LH side of the aircraft to direct light via light transmission elements 65-1, 65-2 to the passive light heads 25-1, 25-2. The LH side aircraft lights include an aviation red and aviation white combination. The RH side aircraft lights includes an aviation green and aviation white combination. FIG. 4B shows a RH aircraft light system 16-2 with light source controller/drive 20-4 and 20-3 connected to optical light switches 66-2 and 66-4 that likewise with respective light buses form the optical light switch network. The optical light switches 66-2, 66-4 direct light via the line transmission elements 65-1, 65-3 to the passive light heads 25-4, 25-3.

The RH and LH light systems are interconnected by an optical light switch 66-5 for directing blue light generator on either side to the opposing side. Hence, if there is a power failure on an opposite, light can be directed from the functioning side to compensate for lack of light generation by use of the optical light switch 66-5 that provides an interconnected channel between both RH and LH lighting systems.

Figure 5:
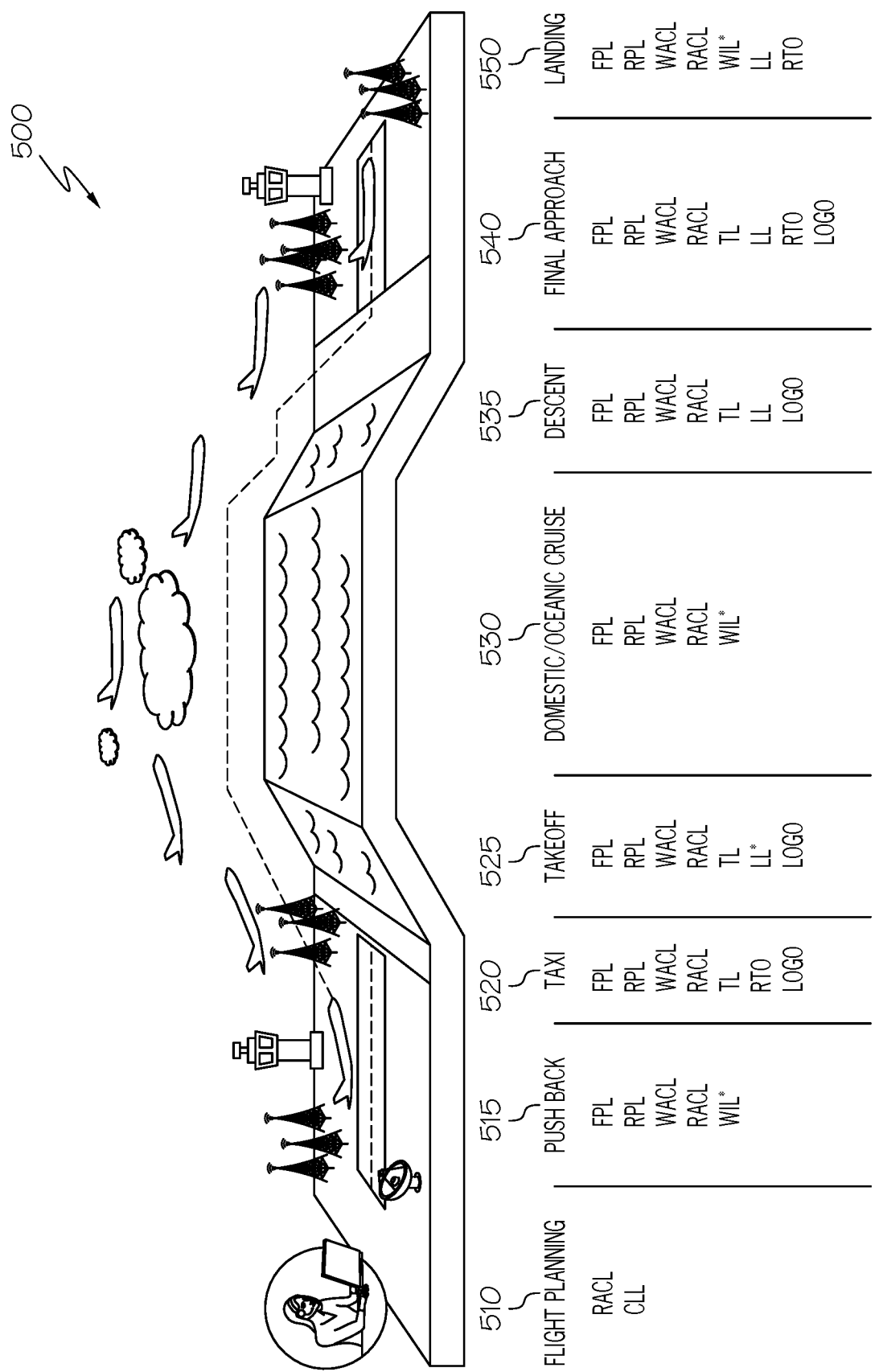
FIG. 5 illustrates a diagram of a load profile of aircraft passive light heads of the LH/RH aircraft lighting system at various aircraft light phases in accordance with herein described embodiments.

FIG. 5 illustrates a diagram of a load profile of aircraft passive loads of the LH/RH aircraft lighting system at various aircraft flight phases in accordance with herein described embodiments. The list of acronyms for aircraft lights are as follows: "RACL" are the Red Anti Collision Lights; "CLL" are the Cargo Loading Lights; "FPL" are the Forward Position Lights; "RPL" are the Rear Position Lights; "WACL" are the White Anti-Collision lights; "WIL" are the Wing illumination Lights; "TL" are the Taxi Lights; "LL" are the Landing Lights; "LOGO" are the Logo Lights; and "RTO" are the Runway Turnoff Lights. In FIG. 5, the profile diagram 500 for each flight phase includes: for the flight planning 510, passive loads: "RACL", "CLL"; for the push back 515, passive loads: "FPL", "RPL", "WACL", "RACL", "WIL"; for the taxiing 520, passive loads: "FPL", "RPL", "WACL", "RACL", "TL", "RTO"; and "logo"; for the takeoff 525, passive loads: "FPL", "RPL", "WACL", "RACL", "TL", "LL"; and "logo"; for the domestic/oceanic cruise 530, passive light heads: "FPL", "RPL", "WACL", "RACL", and "WIL"; for the descent 535, passive loads: "FPL", "RPL", "WACL", "RACL", "TL", "LL"; and "logo"; for the final approach 540, passive loads: "FPL", "RPL", "WACL", "RACL", "TL", "LL"; "RTO", and "logo"; and for the landing 550, the passive loads: "FPL", "RPL", "WACL", "RACL", "WIL", "LL"; and "RTO".

The passive loads of each of the flight phases: flight/planning 510, pushback 515, taxi 520, takeoff 525, domestic/oceanic cruise 530, descent 535, final approach 540, and landing 550 are matched or optimized by a set of configurations set by modes of operation of the LGCU (or other aircraft lighting control systems) based on the particular or expected aircraft flight phase. This results in a cost savings and increases the life expectancy for the lighting system components by balancing the light lumen demands that are necessitated by each flight phase and not under or over using the components more than is required. In various exemplary embodiments, the LGCU or other lighting systems can be programmed for predictive, expected and reactive operations and for operating modes to ensure optimum luminance control to output appropriate flux and intensity levels by the passive lighting loads or to correct/adjust levels of flux and intensity in use or required for each flight phase.

Figure 6:
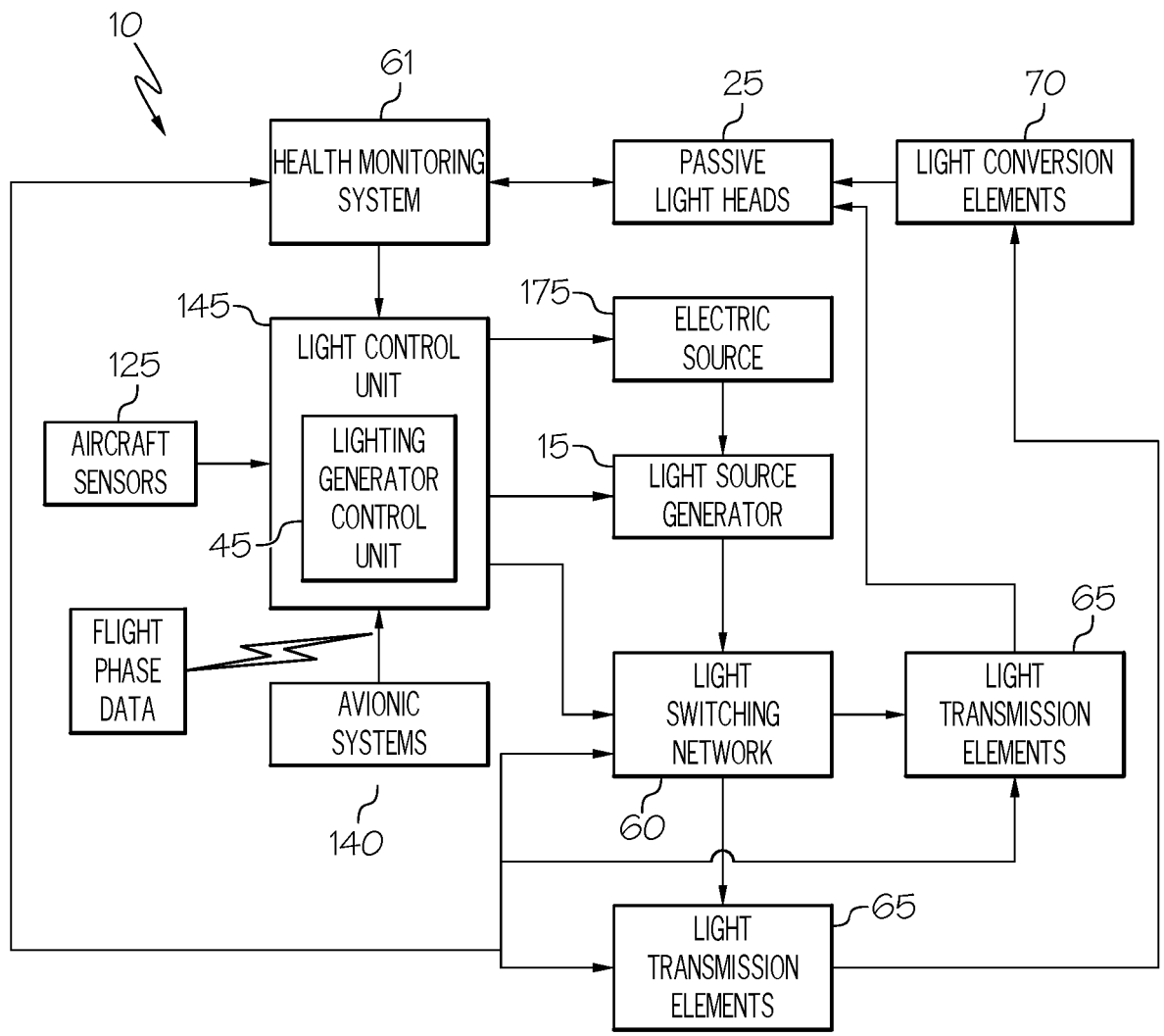
FIG. 6 illustrates a functional block diagram of the aircraft lighting system, in accordance with herein described embodiments.

FIG. 6 illustrates a functional block diagram of the aircraft lighting system, in accordance with herein described embodiments. FIG. 6 is a block diagram of the aircraft lighting system ("system") 10 in accordance with an exemplary embodiment. It should be understood that FIG. 6 is a simplified representation of the system 10 for purposes of explanation and ease of description. Further exemplary embodiments of the system 10 may include additional or other devices and components for providing further functions and features. The system 10 can be utilized in an aircraft, such as a helicopter, airplane, or unmanned vehicle. Moreover, exemplary embodiments of the system 10 can also be utilized in spacecraft, ships, submarines, and other types of vehicles. For simplicity, exemplary implementations are described below with reference to "aircraft."

As shown in FIG. 6, the system 10 includes a lighting control unit 145, a Light Generator Control Unit (LGCU) 45, health monitoring systems 61, an avionic systems 140, aircraft sensors 125, electric source 175, light source generator 15, light switch network 60, light transmission elements 65, light conversion elements 70 and passive light heads 25. Although the system 10 appears in FIG. 6 to be arranged as an integrated system, the system 10 is not so limited and can also include an arrangement whereby one or more aspects of the system 10 are separate components or subcomponents of another system located either onboard or external to the aircraft. Additional details about the function and operation are provided below after a brief introduction of the components of the system 10.

The LGCU 45 may be a computer processor associated with the various aircraft functions discussed below. In one exemplary embodiment, the LGCU 45 functions (as an independent unit) to at least receive and/or retrieve aircraft flight management information (e.g., from the flight management system 140), aircraft sensors 125 and other aircraft systems (not shown) that may include: navigation systems, databases, communication systems etc. The LGCU 45 monitors and evaluates sensor information, and as appropriate, initiates control commands for controlling the components of the lighting systems such as the electric source 175, the light source generator 15, the light switches 60 for generating light transmissions, for directing light on light transmission elements 65 and for selectively converting light at light conversion elements 70 prior to light presented at the passive light head 25.

The passive light head 25 and the light transmission elements 65 are monitored for levels of degradation by the health monitoring system 61. The LGCU 45 may function as a graphics display generator to generate display commands based on algorithms or other machine instructions stored in the LGCU 45 (or in a database or other memory components). The LGCU 45 then sends the generated display commands to a display device (not shown) for presentation to a user.

Depending on the embodiment, the LGCU 45 may be implemented or realized with a general purpose processor, a content addressable memory, a digital signal processor, an application specific integrated circuit, a field programmable gate array, suitable programmable logic device, discrete gate or transistor logic, processing core, discrete hardware components, or any combination thereof. In practice, the LGCU 45 includes processing logic that may be configured to carry out the functions, techniques, and processing tasks or methods associated with operation of the system 10. In one exemplary embodiment, the LGCU 45 is implemented with on-board logic to provide the functions described below in real-time to the aircraft operator. In other embodiments, one or more aspects may be located remotely and/or evaluated at a later time.

In various exemplary embodiments, the LGCU 45 is optimized by programming to enable the control and use of the aircraft light components such as the light source generator 15, light bus 55, light switches 60, light transmission elements 65, light conversion elements 70, aircraft sensors 125, and passive light heads 25 installed at aircraft light locations.

In various embodiments, the LGCU 45 includes a processor programmed to control and optimize the Left Hand and Right Hand side independent lighting systems.

In various embodiments the LGCU 45 control via wired and wireless communications components of the aircraft lighting system including the light source generation (light source and associated electronics) at remote locations from the light location.

In various embodiments the LGCU 45 controls via wired and wireless communications to enable the light source generation to be optimized based on the light load demand profile during aircraft flight phases received from the flight management system 140 where in instances, the light source generation is utilized in a time phased manner based on the aircraft flight phases. The light switches 60 in communication can be located at remote location; not at the light location (i.e. passive light heads 25). The light bus 55 transfer between the left hand lighting system and right hand lighting system can be linked to other buses in communication with various avionic systems and the light data transmissions can be embedded in aircraft structure or be wirelessly communicated. The resultant lighting system achieves lighter weight at the light locations, in comparison to the legacy lighting system by implementing the distributed lighting component architecture wherein the components at the light location require only the passive light head (i.e. for a legacy lighting system only a passive light head is replaced or substituted at the light location).

Figure 7:
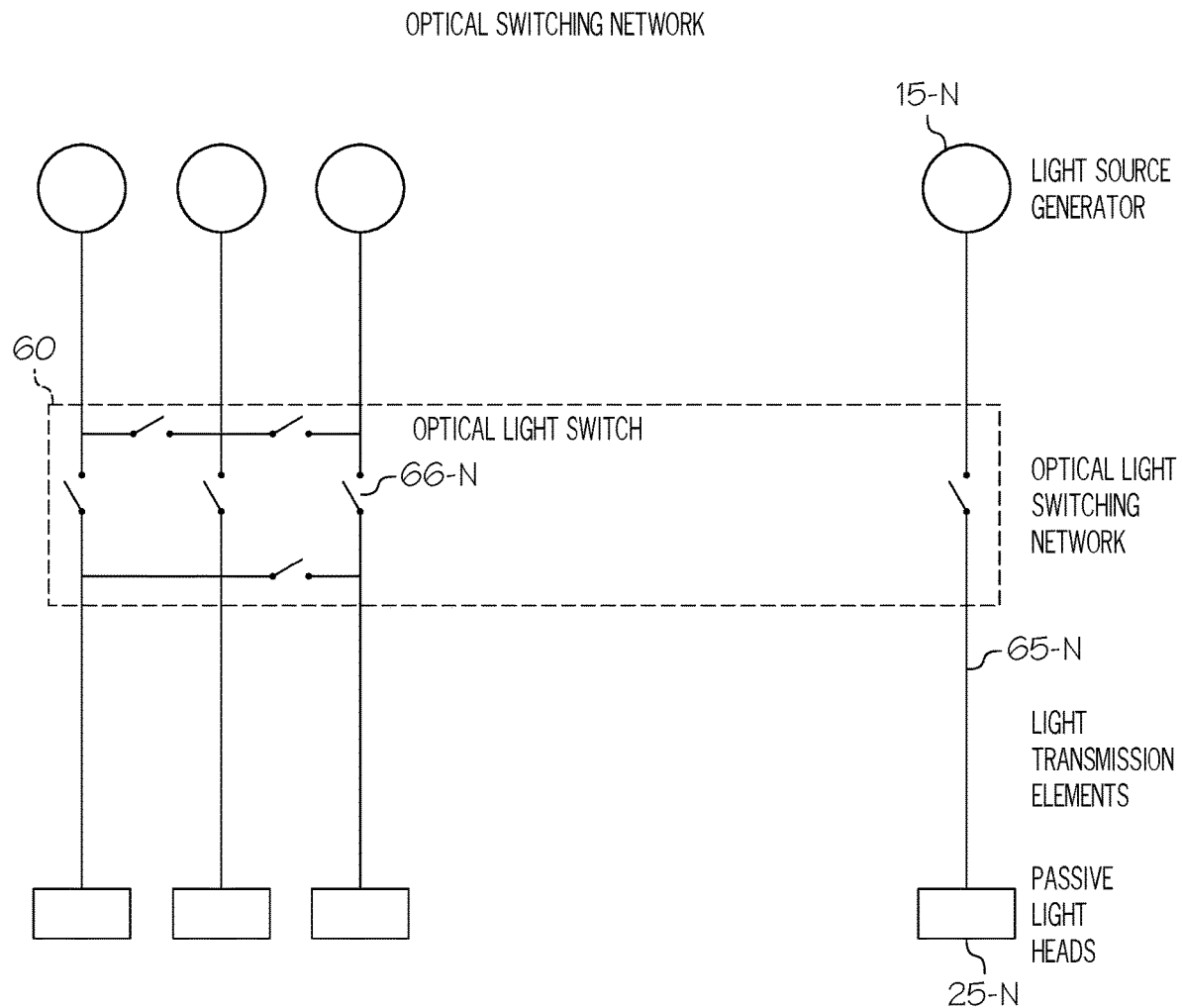
FIG. 7 illustrates a diagram of the switching network of the aircraft lighting system in accordance with herein described embodiments.

FIG. 7 illustrates a diagram of the optical switching network of the aircraft lighting system in accordance with an embodiment. In FIG. 7, the optical light switching network 60 includes optical light switches 66-N configured to route light from the light source generators 15-N via the light transmission elements 65-N to the respective passive light heads 25-N. The optical light switching network 60 includes light buses that send light to the passive light heads 25-N. The light buses are connected to the optical light switches 66-N which are selectively switched by ON/OFF commands from the lighting generator control unit (not shown) to route aviation red, aviation green, and blue light to the passive light heads 25-N. The blue light is selectively by commands to the optical light switches 66-N to enable the blue light to be directed/routed on light transmission elements 65-N connected to conversion elements (not shown) to convert the blue light at the passive light head to the aviation white light.

The passive light heads 25-N do not require an electrical source for operation and therefore a fiber cable which is used for the light transmission elements 65-N does not require an electrical chassis ground bonding at a light assembly which includes the passive light heads 25-N to be grounded to an aircraft structure. This is because there is no drive circuitry required to power the passive light heads 25-N as is the case in conventional non-passive light heads. In various exemplary embodiments, the conversion elements for converting the aviation blue light to the aviation white light can be located away from the passive light heads 25-N to enable the light conversion prior to being received at the passive light heads 25-N.

Figure 8:
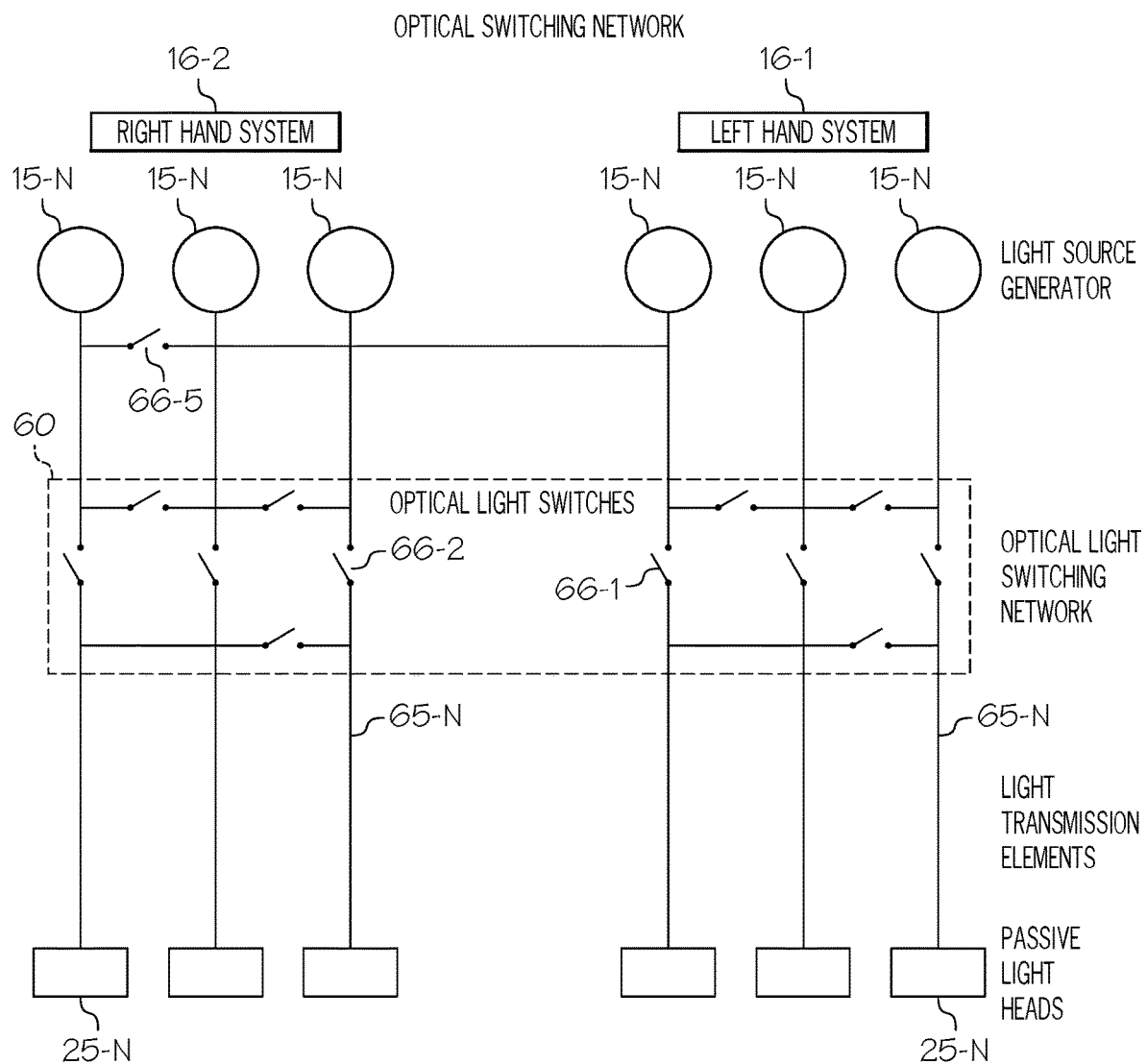
FIG. 8 illustrates a diagram of the switching network of both the LH and the RH aircraft lighting system in accordance with herein described embodiments.

FIG. 8 illustrates a diagram of the optical switching network of the aircraft lighting system in accordance with an embodiment. In FIG. 8 both the RH side aircraft lighting system 16-2 and the LH side aircraft lighting 16-1 are connected by the optical light switching network 60. The optical light switching network 60 includes optical light switches 66-2 on the right side of the aircraft and optical light switches 66-1 on the left side of the aircraft. In addition, there is shown an additional exemplary optical light switch 66-3 for directing light from either the RH side of the aircraft to the LH side of the aircraft or from the LH side of the aircraft to the RH side of the aircraft.

If a power failure where to occur on either side of the aircraft (i.e. as a result of an engine failure, electrical short etc.), light generated from the opposite side of the aircraft can be re-directed by commands to the optical light switch 66-3 on channel to the other lighting system to enable both the LH and RH light systems of the aircraft to receive generated light from a single light source and to display at least aviation blue light. It is contemplated that while a particular exemplary configuration of optical lighting switches is described, the present disclosure is not limited to the configurations described and a variety or multitude of optical light switch implementations can be used depending on the aircraft and the type of interconnections that are desired or required. In addition, it is contemplated, that likewise, not only could blue light be channeled from the LH to the RH side or vice versa, but also red and green lights. In other words, a multitude of interconnections can be implemented directing light between the RH and LH side of the aircraft as needed.

In addition, like in FIG. 7, the optical light switches 66-2 of the RH side 16-2 and the optical light switches 66-1 of the LH side 16-1 both make up the optical switching network 60, and are connected to light source generators 15-N directing light as commanded via light transmission elements 65-N to passive light heads 25-N.

Figure 9:
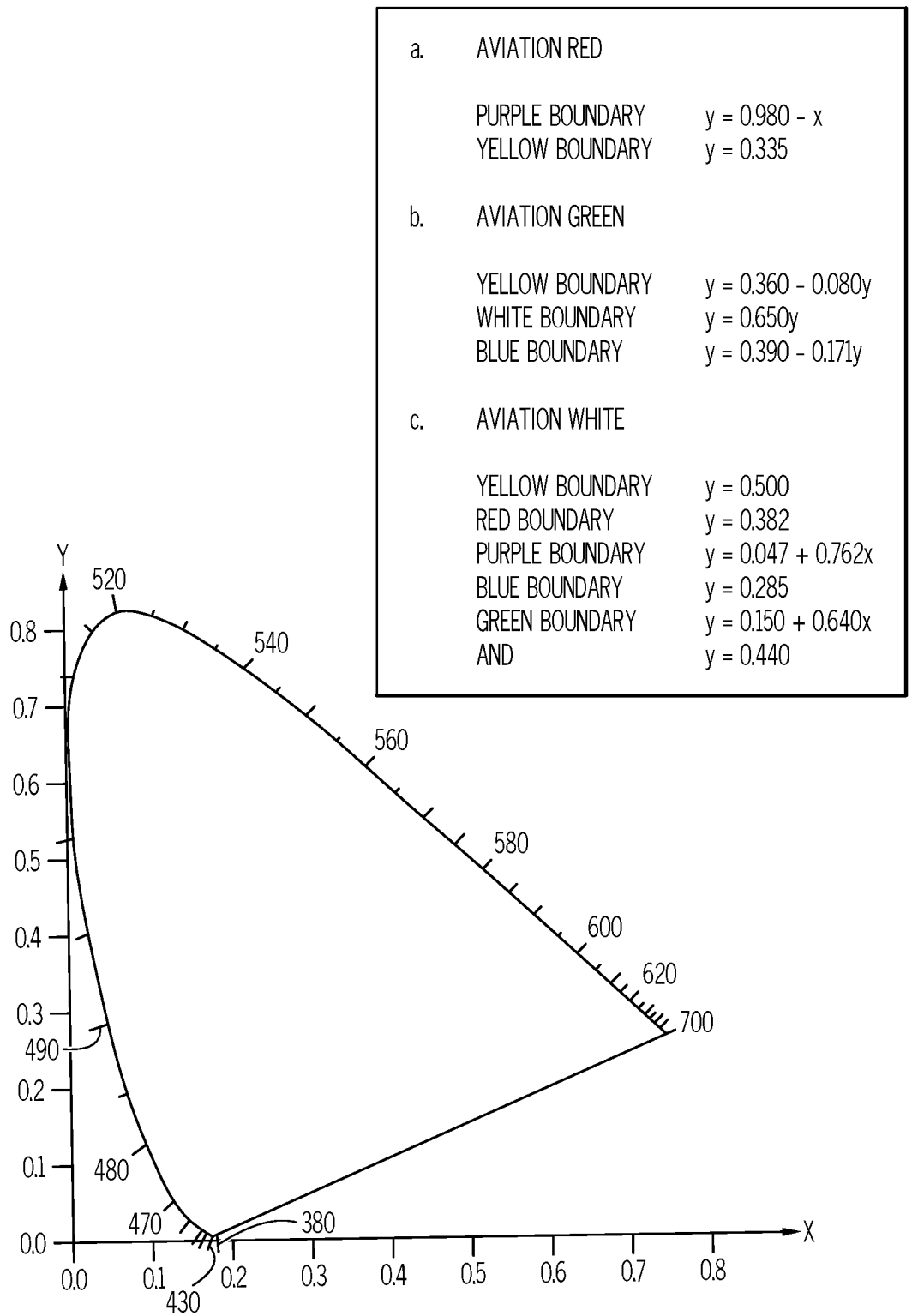
FIG. 9 illustrates a diagram of the aviation colors of the aircraft lighting system in accordance with herein described embodiments.

FIG. 9 illustrates a diagram of the aviation colors of the aircraft lighting system in accordance with an embodiment. In FIG. 9 there is shown the light color specifics for red, green, white light to qualify as aviation red, aviation green and aviation white light. Hence, the light channeled by the optical switching network of the RH and LH aircraft lighting systems meets the requirements as defined in the color position graph of FIG. 9 to qualify as aviation red, green and white light.

The foregoing detailed description is merely exemplary in nature and is not intended to limit the application and uses. Furthermore, there is no intention to be bound by any expressed or implied theory presented in the preceding technical field, background, brief summary or the detailed description. It should be understood that throughout the drawings, corresponding reference numerals indicate like or corresponding parts and features. As used herein, the term system or module may refer to any combination or collection of mechanical systems and components and/or other suitable components that provide the described functionality.

Embodiments may be described herein in terms of functional and/or logical block components and various processing steps. It should be appreciated that such block components may be realized by any number, combination or collection of mechanical components configured to perform the specified functions. Those skilled in the art will appreciate that the herein described embodiments may be practiced in conjunction with any number of mechanical components and systems, and that the systems described herein are merely exemplary.

For the sake of brevity, conventional components and techniques and other functional aspects of the components and systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments.

It should be understood that various changes can be made in the function and arrangement of elements without departing from the scope of the disclosure as set forth in the appended claims and the legal equivalents thereof. Accordingly, details of the exemplary embodiments or other limitations described above should not be read into the claims absent a clear intention to the contrary.

What is claimed is:

1. An aircraft exterior-lighting system with a distributed lighting component architecture, comprising:
    at least one light source generator actuated by an electric drive source and serving as a common light source for generating light to a plurality of passive light heads;
    at least one lighting generator control unit (LGCU) for controlling the at least one light source generator; and
    a light switch network coupled to the at least one light source generator wherein the light switch network is receiving at least one of a plurality of types of light generated,
    and is further selectively coupled to a light conversion element for generating a different type of light at the passive light head,
    the light switch network further comprising:
    a plurality of light switches, each light switch coupled between the light source generator and an associated one of the plurality of light transmission elements, each light switch responsive to a switch command from the LGCU to move between an open position, in which the switch optically does not direct the light of the light source generator from an associated light transmission element, and a closed position, in which the switch optically directs light from the light source generator to the associated light transmission element;
    wherein the LGCU is coupled to the light source generator and each of the light switches, the LGCU configured to: (i) command the light source generator for generating light in accordance with a light load demand profile wherein the light load demand profile comprises a control mode to operate a set of passive heads for select flight phases and (ii) command each of the light switches to move to the open position or to the closed position, whereby the light generated by the light source generators is selectively supplied to at least one of the passive light heads.

2. The aircraft lighting system of claim 1 further comprising:
    the light source generator configured to generate a set of lights comprising: a first light type of blue light, a second light type of green light, a third light type of red light, a fourth light type of white light wherein the white light is generated by converting the blue light or any other available suitable colored light generated which can be effectively converted into white light wherein the green, red and white lights comprise: an aviation green, an aviation red light, and an aviation white light respectively.

3. The aircraft lighting system of claim 1 further comprising:
    the light source generator configured at a location which is remote from the passive light head wherein the location of the light source generator is less exposed to an exterior environment of an aircraft.

4. The aircraft lighting system of claim 1 further comprising:
    the light load demand profile received by the LGCU during a particular flight phase to control the light presented by the passive light head based on an aircraft flight phase.

5. The aircraft lighting system of claim 1 wherein the light load demand profile is associated with a set of aircraft flight phases which comprise: a flight planning, a push-back, a taxiing, a takeoff, a cruising, a descending, a final approach and a landing wherein the flight planning comprises: a cargo landing.

6. The aircraft lighting system of claim 1, further comprising:
    a fiber cable used as the light transmission element coupled to the light switch network, enabling light transmission by directing light on a selected channel of the fiber cable to at least one of the passive light heads.

7. The aircraft lighting system of claim 1, further comprising:
    a health monitoring system configured to provide notification for a level of degradation of performance of a set of components comprising at least one or more of: the passive light head, the light source generator, and the light switch.

8. The aircraft lighting system of claim 2 further comprising:
    a left hand side lighting system;
    a right hand side lighting system;
    an interconnected light switch configured for connecting the left hand side lighting system and the right hand side together wherein the interconnected light switch is responsive to switch commands from the LGCU to direct light from either side to an opposite side wherein the light is generated from at least one light source generator for sending at least one of the first, second, and third light types to the passive light heads on located on the opposite side.

9. The aircraft lighting system of claim 8 further comprising:
    at least one light conversion element connected between an associated light transmission element and the passive light head with the white light.

10. The aircraft lighting system of claim 4, wherein the fiber cable enables light transmission without requiring an electrical chassis ground bonding of an assembly comprising: the passive light head to an aircraft structure.

11. The aircraft lighting system of claim 7, further comprising:
the LGCU coupled to the health monitoring system to enable monitoring of the performance of the set of components and for optimizing performance of the light source generators by commanding the light switches to ensure minimum amount of lights required produced during each flight phase by a set of passive light heads.

12. An aircraft exterior-lighting apparatus, comprising at least one lighting generator control unit (LGCU) controlling at least one light source generator for generating light to a set of a plurality of passive light heads;
the at least one light source generator generating a blue, a red, or a green light, wherein each light comprises: a respective blue, aviation red or aviation green light;
a light switch network coupled to the at least one light source generator to receive the blue, the aviation red or the aviation green light and for converting the blue light at the passive light head to a white light wherein the white light comprises: an aviation white light;
a plurality of light transmission elements coupled to the at least one light source generator;
the light switch network comprising: a plurality of light switches, each light switch coupled between the light source generator and an associated one of the plurality of light transmission elements, each light switch responsive to the LGCU to not direct the light of the light source generator from an associated light transmission element, and to direct light from the light source generator to the associated light transmission element; and
a plurality of light conversion elements, each light conversion element connected between the associated light transmission element and the passive light head when converting the blue light to the aviation white light at the passive light heads for presenting by the passive light heads;
wherein the LGCU is coupled to the light source generator and coupled to each of the light switches, the LGCU is configured to (i) command the light source generator to generate light in accordance with a light load demand profile wherein the light load demand profile comprises a control mode to operate a set of passive heads for select flight phases and to (ii) selectively command each of the light switches to move to an open or a closed position, whereby the light generated by each of the light source generators is selectively supplied to one or more of the passive light heads.

13. The aircraft lighting system of claim 12, the light switch network further comprising:
a set of optical switches for: (i) directing light which is transmitted to transmission elements associated with each passive light head, for (ii) not directing light from transmission to transmission elements associated with each passive light head and for (iii) diverting light between a set of different transmission elements.

14. The aircraft lighting system of claim 12, further comprising:
a health monitoring system configured to:
monitor at least one or more of the passive light head, light switch, and the transmission element to provide a notification for a level of degradation of performance of the passive light head or the transmission element.

15. The aircraft lighting system of claim 13, further comprising:
the light source generator configured at a location which is remote from the passive light head wherein the location of the light source generator is less exposed to an exterior environment of an aircraft.

16. The aircraft lighting system of claim 15, further comprising:
a light load demand profile received by the LGCU during a particular flight phase to control the light at the passive light head based on an aircraft flight phase.

17. The aircraft lighting system of claim 16, wherein the light load demand profile is associated with a set of aircraft flight phases which comprise: a flight planning, a push-back, a taxiing, a takeoff, a cruising, a descending, a final approach and a landing flight phase wherein the flight planning comprises: a cargo loading.

18. The aircraft lighting system of claim 17, further comprising:
a fiber cable used as the light transmission element coupled to the optical light switch for light transmission by directing light on a selected channel of the fiber cable to the passive light head.

19. The aircraft lighting system of claim 18, wherein the fiber cable enables light transmission without requiring an electrical chassis ground bonding of the passive light head to an aircraft structure.

20. An aircraft exterior-lighting system, comprising:
at least one lighting generator control unit (LGCU) controlling at least one light source generator for generating light to a set of a plurality of passive light heads;
the at least one light source generator generating a blue, an aviation red, or an aviation green light;
a light switch network coupled to the at least one light source generator to receive the blue, the aviation red or the aviation green light and to convert the blue light at the passive light head to an aviation white light;
a plurality of light transmission elements coupled to the at least one light source generator;
the light switch network comprising: a plurality of light switches, each light switch coupled between the light generator and an associated one of the plurality of light transmission elements, each light switch responsive to the LGCU to isolate the light of the light generator from an associated light transmission element, and alternately to direct light from the light generator to the associated light transmission element;
a plurality of light conversion elements, each light conversion element connected between the associated light transmission element and the passive light head to convert the blue light to the aviation white light at the passive light heads for presentation as required;
the LGCU coupled to the light source generator and each of the light switches, the LGCU configured to (i) command the light source generator to generate light in accordance with a light load demand profile wherein the light load demand profile comprises a control mode to operate a set of passive heads for select flight phases and to (ii) selectively command each of the light switches to move to an open or a closed position, whereby the light generated by each of the light source generators is selectively supplied to one or more of the passive light heads;
a fiber cable used as the light transmission element coupled to the optical light switch for light transmission by directing light on a selected channel of the fiber cable to the passive light head; and a passive light head which is lighter and more compact than a replaceable legacy light head at an exterior lighting location of an aircraft.

\* \* \* \* \*